United States Patent Office 3,637,799
Patented Jan. 25, 1972

3,637,799
SUSPENSION MEDIUM FOR NITRILOPOLY-ACETONITRILE
Jack L. Herz, Scarsdale, N.Y., assignor to Stauffer Chemical Company, New York, N.Y.
No Drawing. Filed Dec. 27, 1968, Ser. No. 787,573
Int. Cl. C07c *121/02*
U.S. Cl. 260—465.5 A    3 Claims

ABSTRACT OF THE DISCLOSURE

A suspension medium for forming a homogeneous slurry of nitrilopolyacetonitrile during manufacture thereof is described herein. The suspension medium may be described as an aqueous solution of an alkali metal inorganic phosphate compound present in an amount ranging between 0.1 and about 15% by weight. The presence of the alkali metal inorganic phosphates aids in maintaining a homogeneous slurry of the nitrilopolyacetonitriles.

BACKGROUND OF THE INVENTION

In the process of manufacturing nitrilopolyacetonitriles, it is the practice to react approximately stoichiometric quantities of ammonia, an aldehyde, and hydrogen cyanide at a temperature range between about 0° C. and 150° C. The particular nitrilopolyacetonitrile to be manufactured will, of course, depend upon the initial reacting components. Such methods are described and claimed in U.S. Pat. Nos. 2,205,995, 2,405,966, 2,855,428 and 3,061,628. Products such as methylene bis-iminodiacetonitrile, nitrilotriacetonitrile, ethylenediaminetetraacetonitrile, and diethylenetriaminepentaacetonitrile can be manufactured by these methods. These nitriles can then be hydrolyzed to their respective acids or salts.

Since the end products are all solid compositions, the initial reaction between the soluble components will cause precipitation of the end products prior to full conversion of the reacting components. This precipitation causes substantial problems during the reaction between the various components. Specifically, the precipitated end product will cause caking in the reaction vessel which will substantially increase the heat transfer problem, thus side reactions will ensue, and the product purity will suffer. Also, the precipitated composition will adhere to the reaction vessel and require scraping for removal thereof for use as the end product. The handability of the liquid solid heterogeneous solution is awkward because of the problems involved in transferring the same from the reaction vessel to the separating apparatus such as centrifuge operators.

Moreover, when suspending the formed solid nitrilopolyacetonitriles in aqueous solution, the solid products will rapidy settle out even with vigorous agitation.

BRIEF DESCRIPTION OF THE INVENTION

It has been discovered that aqueous solutions of an alkali metal inorganic phosphate compound form a homogeneous slurry when admixed with the reaction components to form the corresponding solid nitrilopolyacetonitrile products. Thus, the solid end product will remain in suspension and substantially reduce the problems involved in handling the liquid solid heterogeneous mixture. The alkali metal inorganic phosphates can be present in amounts ranging between 0.1 and about 15% by weight of the solution.

DETAILED DESCRIPTION OF THE INVENTION

In practicing the present invention, methylene-bis-iminodiacetonitrile is first prepared. Thus, a solution of an ammonia and formaldehyde adduct is formed by adding ammonia to formaldehyde maintained at a relatively low temperature. Anhydrous ammonia is preferred to aqueous solutions as high yields are obtained. The rate of addition of ammonia is controlled to keep the temperature low. The temperature is maintained below about 50° C. and preferably between about 10° C. and 35° C. for the best results. The pH of the liquid phase is then adjusted to a strong acid level, i.e., between about 0 and 2 and preferably about 1 or less for the best yield. The pH is controlled by the addition of a mineral acid, such as sulfuric acid or hydrochloric acid. Liquid hydrogen cyanide is then added to the liquid phase while maintaining the temperature below about 50° C. and preferably below about 35° C. The ammonia, formaldehyde and hydrogen cyanide are used in the amounts stoichiometrically necessary for the formation of the methylene-bi-iminodiacetonitrile, i.e. in a molar ratio of 2 moles of ammonia, 5 moles of formaldehyde and 4 moles of hydrogen cyanide to provide 1 mole of methylene-bis-iminodiacetonitrile. A small excess of hydrogen cyanide can be used to offset any loss of hydrogen cyanide.

To form nitrilotriacetonitrile, the methylene-bis-iminodiacetonitrile is reacted with additional liquid hydrogen cyanide and formaldehyde. The reaction can be carried out by adding formaldehyde to a liquid phase mixture of methylene-bis-iminodiacetonitrile and liquid hydrogen cyanide or by adding a liquid hydrogen cyanide to a liquid phase mixture of methylene-bis-iminodiacetonitrile and formaldehyde. The temperature is preferably maintained between about 50° C. and 85° C. The stoichiometric amount of the reactants are used to provide the end product. In the event that methylene-bis-iminodiacetonitrile is the desired end product, it is simply filtered off and separated from the mother liquor. The nitrilotriacetonitrile is similarly filtered off.

Alternatively, nitrilotriacetonitrile can be formed by reacting stoichiometric quantities of ammonia, formaldehyde, and hydrogen cyanide together at temperatures ranging between about 50 and 85° C. for a sufficient length of time to form the nitrilotriacetonitrile.

Irrespective of which mechanism that is employed, it has been found that the methylene-bis-iminodiacetonitrile and nitrilotriacetonitrile will precipitate immediately when they are formed with any reaction medium, even with vigorous agitation. In order to prevent this precipitation and to form a homogeneous slurry, from about 0.1 to about 15% by weight of the solution of an alkali metal phosphate material is dissolved within the reaction medium. These alkali metal phosphates can be selected from the group consisting of sodium pyrophosphate, sodium tripolyphosphate, the sodium salts of glassy phosphate, sodium phosphate, potassium pyrophosphate, potassium tripolyphosphate, the potassium salts of glassy phosphate, potassium phosphate, by the addition of the above stated amount of the phosphate composition. The formed solid end product will remain in suspension with any reaction medium and can be readily handled and filtered off without hindering the rate of reaction of the reacting components.

In order to illustrate the merits of the present invention, the following examples are provided:

Example 1

An example of methylene-bis-iminodiacetonitrile was suspended in an aqueous solution of tetrasodium pyrophosphate at a pH of 0.5. The composition of the suspension was 25% methylene-bis-iminodiacetonitrile, 1% tetrasodium pyrophosphate and 74% water adjusted to the final pH. The suspension of methylene-bis-iminodiacetonitrile was made homogeneous by vigorous stirring and by circulation through a centrifugal pump. The pump and stirrer were then shut off. The suspension began to settle out at a slow rate.

Example 2

The procedure as set forth in Example 1 was repeated in its entirety except no tetrasodium pyrophosphate was added. The suspension settled out rapidly. After 20 seconds, no material was left in suspension.

Example 3

The procedure as set forth in Example 1 was repeated in its entirety except nitrilotriacetonitrile was substituted for the methylene-bis-iminodiacetonitrile. The results paralleled those obtained in Example 1.

Example 4

Nitrilotriacetonitrile was prepared by reacting stoichiometric portions of ammonia, formaldehyde and hydrogen cyanide with vigorous agitation to form methylene-bis-iminodiacetonitrile. Prior to conversion of all the reacting components, a considerable amount of solid methylene-bis-iminodiacetonitrile had precipitated to the bottom of the container of the reaction vessel. Thereafter, a stoichiometric amount of hydrogen cyanide and formaldehyde were entered thereto with considerable amount of stirring. Again, prior to complete conversion of the reacting components, a considerable amount of solid nitrilotriacetonitrile had precipitated to the bottom of the reaction vessel. Moreover, a considerable amount of time was required to contact the solid methylene-bis-iminodiacetonitrile with the addition hydrogen cyanide and formaldehyde to form nitrilotriacetonitrile.

Example 5

The procedure as outlined in Example 4 was repeated in its entirety except 5% by weight of tetrasodium pyrophosphate was added to the system. Only small amounts of the formed methylene-bis-iminodiacetonitrile had precipitated to the bottom of the vessel and no difficulty was experienced in contacting the additional hydrogen cyanide and formaldehyde with the solid methylene-bis-iminodiacetonitrile to form the nitrilotriacetonitrile. Also, only a slight amount of the solid nitrilotriacetonitrile had precipitated to the bottom of the reaction vessel.

While the above description has been set forth as relating to the manufacture of methylene-bis-iminodiacetonitrile and nitrilotriacetonitrile, it is understood that the above procedure is equally applicable to the manufacture of ethylenediaminetetraacetonitrile, diethylenetetraaminepentaacetonitrile, and ortho - phenylenediaminetetraacetonitrile, and 1,2-diaminocyclohexanetetraacetonitrile.

What is claimed is:

1. In a process for manufacturing methylene-bis-iminodiacetonitrile by the reaction of ammonia, formaldehyde and hydrogen cyanide in an aqueous medium at temperature between about 10° C. and 35° C. the improvement comprising, dissolving in the aqueous medium a sufficient amount of an alkali metal inorganic phosphate salt selected from the group consisting of sodium pyrophosphate, sodium tripolyphosphate, sodium phosphate, sodium salt of glassy phosphate, potassium pyrophosphate, potassium tripolyphosphate, potassium phosphate, potassium salt of glassy phosphate, and mixtures thereof to maintain the methylene-bis-iminodiacetonitrile in a homogenous suspension.

2. The process as set forth in claim 1 wherein said alkali metal inorganic phosphate salt is present in an amount ranging between about 0.1 and about 15% by weight of the aqueous medium.

3. The process as set forth in claim 1 including the additional step of reacting the homogenous suspension of methylene-bis-iminodiacetonitrile with additional hydrogen cyanide and formaldehyde to form a homogenous suspension of nitrilotriacetonitrile.

References Cited

UNITED STATES PATENTS

| | | | |
|---|---|---|---|
| 2,794,044 | 5/1957 | Miller | 260—465.5 |
| 2,855,428 | 10/1958 | Singer et al. | 260—465.5 |
| 3,061,628 | 10/1962 | Singer, Jr., et al. | 260—465.5 |
| 3,167,580 | 1/1965 | Saunders et al. | 260—465.5 |
| 3,167,581 | 1/1965 | Saunders et al. | 260—465.5 |
| 3,167,582 | 1/1965 | Saunders et al. | 260—465.5 |
| 3,256,314 | 6/1966 | Dovell et al. | 260—465.5 |
| 3,412,137 | 11/1968 | Stutts | 260—465.5 |

FOREIGN PATENTS

| | | | |
|---|---|---|---|
| 974,787 | 11/1964 | Great Britain | 260—465.5 |

JOSEPH P. BRUST, Primary Examiner

U.S. Cl. X.R.

260—464, 465 E